United States Patent
Görsch et al.

(10) Patent No.: US 7,194,378 B2
(45) Date of Patent: Mar. 20, 2007

(54) COORDINATE MEASURING APPARATUS AND METHOD FOR MEASURING A WORKPIECE

(75) Inventors: Daniel Görsch, Dresden (DE); Andreas Lotze, Dresden (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 0 days.

(21) Appl. No.: 11/065,153

(22) Filed: Feb. 25, 2005

(65) Prior Publication Data

US 2005/0165578 A1    Jul. 28, 2005

Related U.S. Application Data

(63) Continuation of application No. PCT/EP2003/007976, filed on Jul. 22, 2003.

(30) Foreign Application Priority Data

Aug. 31, 2002    (DE)    ................ 102 40 307

(51) Int. Cl.
    *G06F 15/00*    (2006.01)
(52) U.S. Cl. ................. 702/155; 702/127
(58) Field of Classification Search ............ 83/75.5; 702/155, 157, 167, 127
    See application file for complete search history.

(56) References Cited

U.S. PATENT DOCUMENTS 5,434,803 A * 7/1995 Yoshida .................. 702/168

2002/0077769 A1 * 6/2002 Ebinger .................. 702/150

FOREIGN PATENT DOCUMENTS

WO    WO 00/06969    2/2000

OTHER PUBLICATIONS

Chen, J; Chen, Y; "Estimation of Coordinate Machine Error Parameters"; IEEE International Conference on Robotics and Automation; vol. 4; Mar. 1987; pp. 196-201.*
"Global and Local Deformations of Solid Primitives", by A. Barr, Computer Graphics, vol. 18, No. 3, Jul. 1984, pp. 21 to 30.

* cited by examiner

*Primary Examiner*—John Barlow
*Assistant Examiner*—Douglas N. Washburn
(74) *Attorney, Agent, or Firm*—Walter Ottesen

(57) ABSTRACT

A method for measuring a workpiece includes the steps: measuring measurement points on the surface of a workpiece using a measuring device; evaluating the measured measurement points in such a manner that a predetermined desired geometry of the workpiece to be measured and an actual geometry defined by the measured measurement points are mapped one on top of the other with the aid of a fitting method. In order to be able to adapt or fit the predetermined desired geometry of the workpiece to a measured workpiece, which had been altered, the application of a fitting method is suggested. In this method, transformation parameters are additionally provided for the fitting. These parameters permit a defined transformation of the desired geometry or of the actual geometry with regard to a targeted change of shape of the desired geometry or of the actual geometry.

20 Claims, 5 Drawing Sheets

COORDINATE MEASURING APPARATUS AND METHOD FOR MEASURING A WORKPIECE

RELATED APPLICATION

This application is a continuation application of international patent application PCT/EP 2003/007976, filed Jul. 22, 2003, and claiming priority from German application 102 40 307.4, filed Aug. 31, 2002, and the entire content of both applications is incorporated herein by reference.

FIELD OF THE INVENTION

The invention relates to a method for measuring a workpiece wherein measuring takes place in such a manner that measurement points on the surface of the workpiece are measured with a measuring apparatus and these measured measurement points are then evaluated in such a manner that a pregiven desired geometry of the workpiece, which is to be measured, and an actual geometry, which is defined by the measured measurement points, are imaged onto each other via an adaptation method in order to derive features therefrom, which are to be checked, of the workpiece to be measured. The invention further relates to a corresponding measuring apparatus with which the method can be executed.

BACKGROUND OF THE INVENTION

A method of the kind described above has already been known for some time from the state of the art and is characterized by those working in the field as a "best fit adaptation".

Usually, the desired geometry, which is to be checked on the workpiece to be measured, is pregiven. The pregiven desired geometry is defined by corresponding geometric parameters such as, for example, points to be contacted. If the test feature, which is to be determined from the measured actual geometry, is, for example, the diameter of a bore, which may not be less than a defined radial diameter, then one would define a circle having a pregiven minimum diameter as a desired geometry which is to be fitted.

Either the desired geometry or the actual geometry, which is defined by the measurement points measured on the workpiece, is then so rotated and shifted that these measurement points are fitted as optimally as possible one inside the other in order to then determine whether the deviation of the measured measurement points is sufficient relative to the fitted pregiven desired geometry. When the desired geometry is shifted, parameters for a rotation matrix as well as parameters for a translation vector are determined in this adaptation operation. These parameters describe the rotation and the translation of the pregiven desired geometry in the direction of the measured measurement points so that the desired geometry comes to lie on the measured points in the best possible manner. If, in contrast, the actual geometry is shifted, parameters for a rotation matrix as well as parameters for a translation vector are determined in this adaptation operation. These parameters describe the rotation and the translation of the actual geometry (or more precisely stated, the rotation and translation of the measurement points) in the direction of the pregiven desired geometry so that the measurement points come to lie on the pregiven desired geometry in the best possible manner.

Usually, the Gaussian method of least squares is used in order to determine these parameters. The parameters of the rotation matrix and of the translation vector are determined in such a manner that the sum of the distance squares between the measured measurement points and the pregiven desired geometry becomes minimal. Alternatively, the method of Tschebyscheff can be used wherein the maximum amount of the distance between a measured measurement point and the pregiven geometry is to be minimized or is to be fitted or adapted to a pregiven tolerance zone.

In somewhat different situations, as they result, for example, with bore diameters, scaling parameters can be provided in addition to the parameters describing the desired geometry. These scaling parameters define the scaling of the desired geometry or the actual geometry so that not only the parameters of the rotation matrix and translation vector are determined via the corresponding adaptation method, but also scaling parameters which define the scaling of the desired geometry or the actual geometry. One such scaling parameter is, for example, the radius of an adapted circle.

The deviations between the actually measured measurement points and a pregiven desired geometry can be determined in a relatively simple manner via the above-described well known methods. The known methods are, however, completely inadequate when the actual geometry of the workpiece, which is to be measured, deviates relative to the pregiven desired geometry. There are different reasons for this. On the one hand, workpieces, which are manufactured in the plastics industry, change their geometry over a long time after the actual manufacturing process. However, on the other hand, it is desirable to check as early as possible as to whether the pregiven manufacturing tolerances are maintained so that the manufacturing process can be readjusted as may be required. However, with conventional methods, it is not possible to simulate such changes of the manufactured workpiece.

A further example for such deviations is noted with respect to the deepdraw method for sheet metal. Here, stresses, which arise because of the deep-draw method, cause distortions of the workpiece. Even though the deep-drawn workpiece is not coincident with the pregiven desired geometry, the workpiece can nonetheless have the provided desired geometry when it was built in as required. Similar effects can occur with metal workpieces which become twisted because of the temperatures occurring during the manufacturing process and have their final form after complete cooling.

Workpieces having fluid dynamic profiles show a different problem, for example, the profile of a turbine vane or blade. The adaptation or fitting of a pregiven desired geometry of a turbine blade profile to the actual geometry of an actually measured turbine blade profile (which is defined by the measurement points) is often very problematic because the actually measured turbine blade profile is often shorter or longer than the pregiven desired geometry. The tolerances of the form deviations usually are very small, the permissible length deviations are, however, very large. For this reason, there is a contradiction between the form deviations and the length deviations especially in the area of an acute angle outlet edge of the turbine blade profile so that a purposeful adaptation of the desired geometry is therefore not possible.

SUMMARY OF THE INVENTION

The invention proceeds from the known adaptation methods so that it is an object of the invention to provide such an adaptation method with which a pregiven desired geometry and an actual geometry of the workpiece to be measured can be mapped one atop the other when the form of the actual geometry, which is defined by the measurement points, deviates relative to the pregiven desired geometry. The actual geometry of the workpiece to be measured is defined by measured measurement points.

The method of the invention is for measuring a workpiece and includes the steps of: measuring measurement points on the surface of the workpiece utilizing a measuring apparatus to obtain measured measurement points; evaluating the measured measurement points so as to map a pregiven desired geometry and an actual geometry defined by the measured measurement points one upon the other with a fitting method; and, providing transformation parameters (a, λ, δ$_t$) for the fitting method wherein the transformation parameters (a, λ, δ$_t$) permit a defined transformation of one of the desired geometry and the actual geometry with respect to a targeted geometric change of form of one of the desired geometry and the actual geometry with the defined transformation going beyond a pure scaling of one of the desired geometry and the actual geometry.

What is significant in the method and measuring apparatus of the invention is that an adaptation or fitting method is used wherein additional generalized transformation parameters are provided in addition to the pregiven desired geometry and optionally available scaling parameters. The transformation parameters define a transformation of the desired geometry or the actual geometry with respect to a sought-after geometric form change of the desired geometry or of the actual geometry. This transformation goes beyond the pure scaling of the desired geometry or the actual geometry.

Parameters for scaling the desired geometry or the actual geometry are understood to mean that the magnitude relationships of the desired geometry or the actual geometry can be changed via these parameters without, however, the actual characteristic form of the desired geometry or of the actual geometry being changed. For example, with a circle, the desired geometry can be the radius of the circle or, for a slot having semicircular shaped ends, the desired geometry can be the radius of the two semicircles delimiting the slot or the distance of the center points of the semicircles. As mentioned initially herein, such parameters for scaling the desired geometry or the actual geometry are optional; that is, such parameters are not necessary for realizing the invention.

On the other hand, the arising measurement errors and therefore the deviation between the desired geometry and the actual geometry can be minimized via a generalized and additional transformation of the measured actual geometry made erroneous by form changes or other occurrences.

The characterization that a pregiven desired geometry and an actual geometry can be mapped one atop the other is here meant to express that the desired geometry can be mapped on the actual geometry as well as that the actual geometry can be mapped on the desired geometry. The actual geometry is defined by the measured measurement points. Actual geometry can mean the measured measurement points themselves, however, it can also mean a geometry, which is derived from the measurement points, for example, the center point of a circle with this geometry being determined from the measurement points of a bore.

The significance of the adaptation method of the invention is that any desired pregivable shape change of the pregiven desired geometry or of the actual geometry can be produced via the additional transformation parameters. The transformation parameters should be so selected that the deformation of the desired geometry or the actual geometry is so influenced that this deformation can be adapted to the particular deformed actual geometry or desired geometry.

For example, for a deep-drawn workpiece, a transformation can be modeled via which the deformations in the desired geometry of a measured workpiece, which result via the deep drawing of the workpiece, are simulated in a direction of a non-deformed desired geometry.

In another example, a time-dependent deformation of the workpiece, which is to be measured, can be simulated via the transformation parameters. Such a workpiece can, for example, be a plastic part. In this way, the additional transformation parameters permit a lengthening of the desired geometry, for example, in precisely one direction.

In a further especially advantageous embodiment of the method of the invention, the desired geometry of the workpiece can be a fluid dynamic profile, that is, the profile of a workpiece which is provided for relative movement with respect to a fluid such as air or water in order to hereby generate forces. For example, the profile can here be: the profile of an airfoil of an aircraft; the profile of the rotor blade of a helicopter; the profile of a propeller blade for an aircraft; the profile of a blade of a ship propeller; or, the profile of a rotor blade of a wind-powered power plant. The method can be especially utilized for the profile of a turbine blade. The transformation parameters define a displacement of points of the desired geometry of the fluid-dynamic profile along a curved displacement line in such a manner that the distance of the points to the curved displacement line remains constant and that this thereby leads to a defined profile expansion or profile crunching.

The curved displacement line should advantageously be so selected that this line essentially approximates the center line of the desired geometry of the profile. A circular line is especially suitable as a displacement line approximating the center line.

For displacing the points, the desired geometry of the fluid-dynamic profile can be partitioned into two parts. The transformation parameters should permit a displacement of the points of both parts along the curved displacement line in different directions. The displacement path of the points along the displacement line should be the same for all points of the first part and be the same for all points of the second part.

Alternatively, the displacement can be so made that a real profile stretching takes place. Here, proceeding from a defined central point of the profile, which preferably lies on the displacement line (as, for example, the intersect point of the entry edge of the profile with the displacement line), the remaining points can be stretched. The displacement of these points along the displacement line takes place proportionally to the path of the particular point (which is to be displaced) to the central point and measured, for example, as a path along the displacement line. This path could be determined in that the vertical is drawn from the point to be displaced to the displacement line (and, if the central point is remote from the displacement line, even from the central point) and the path along the displacement line is determined between the foot points of the verticals.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
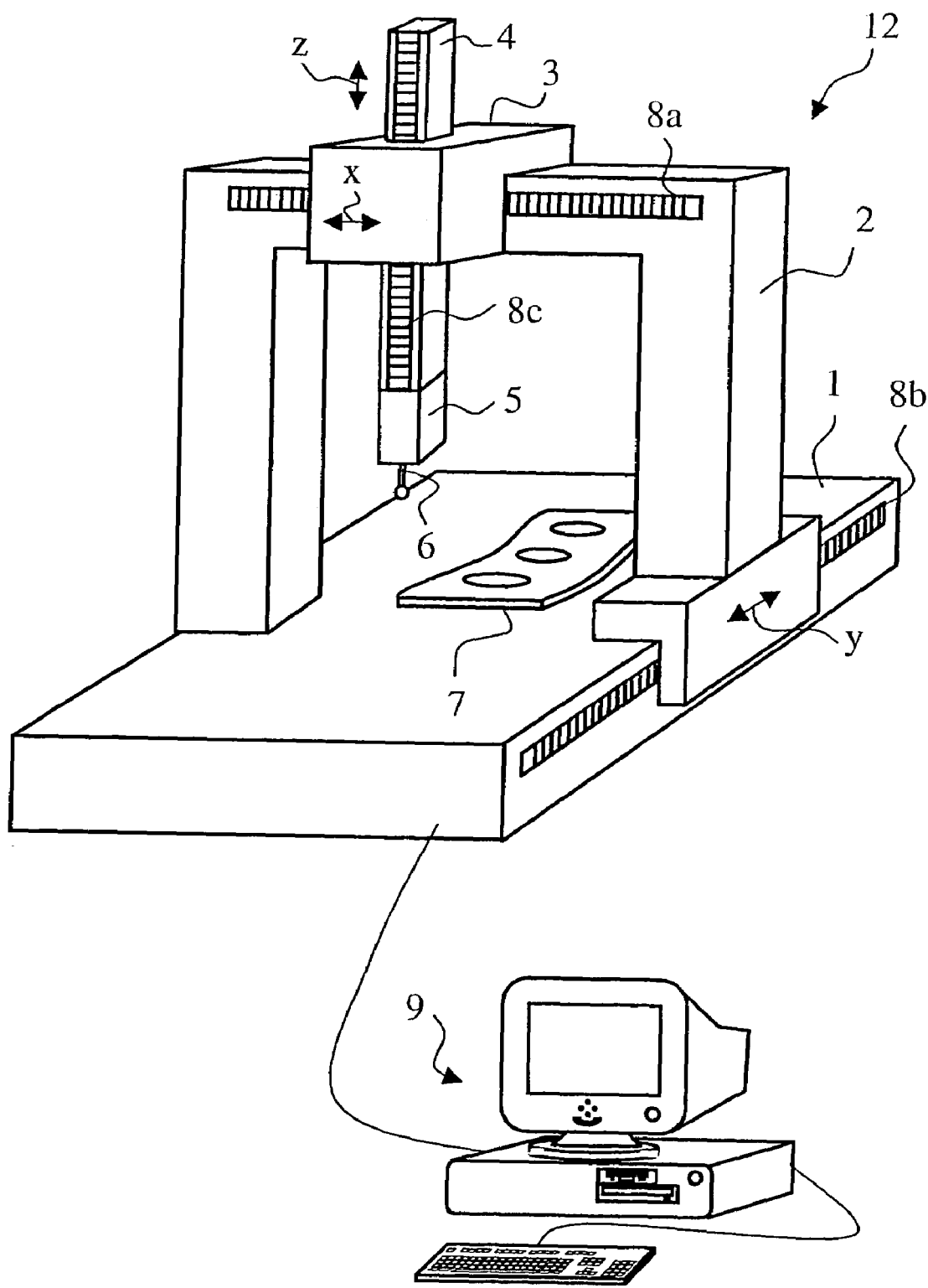
FIG. 1 is a perspective view of a measuring apparatus for recording the measurement points of a workpiece 7.

FIG. 1 shows a schematic of a measuring apparatus for recording measurement points of a workpiece 7 to be measured. The measuring apparatus is here shown as a coordinate measuring apparatus by way of example.

The measuring apparatus has a portal 2 which is motorically driven relative to a measuring table 1 in the direction of arrow (y) and the position of the portal 2 is measured relative to a measuring scale 8b. The traverse of the portal 2 stretches across the measuring table 1. A carriage 3 is provided along the traverse and is motorically driveable in the direction of arrow (x) and the position of the carriage can be taken off at the measuring scale 8a. A spindle 4 is journalled on the carriage 3 and can be motorically driven in the direction of the arrow (z) and the position of the spindle can be taken off at the measuring scale 8c. A probe head 5 having a probe pin 6 is disposed at the lower end of the spindle 4. The probe pin 6 can be deflected relative to the probe head 5 in the three coordinate directions (x, y, z). The contacted measurement points of the workpiece 7 can be determined from the read-out values of the measurement scales (8a to 8c) and the deflections of the probe pin 6 relative to the probe head 5. The control of the coordinate measuring apparatus 12 as well as the evaluation of the determined measurement values takes place in the computer 9 utilized as a control unit as well as an evaluation unit.

It is understood that, in lieu of the coordinate measuring apparatus shown, a completely different measuring apparatus can be used for recording the measurement points. Also, other probe heads such as a so-called switching probe head or an optical probe head can be used. The switching probe head determines only a contact with the workpiece. The mechanics for moving the probe head 5 relative to the workpiece 7 could likewise be configured completely differently. For example, a bridge mechanism or stand mechanism or a mechanism having rotational joints can be utilized. Alternatively, the measuring table 1 could be displaceably journalled in one or several directions so that the workpiece 7 and not the probe head 5 is moved in the particular direction. Furthermore, the apparatus need not be a coordinate measuring apparatus. For simpler measuring tasks, an apparatus can be used with which the workpiece is measured in only two dimensions. If a video camera is used as the probe head, then not even the probe head need be moved relative to the workpiece to be measured.

In the following, it will be explained in detail how a similarity transformation of the above kind with corresponding transformation parameters takes place in the evaluation unit, that is, in the computer 9. The transformation parameters permit a defined transformation of the desired geometry relative to a targeted geometric form change of the desired geometry.

(x) is an individually given desired point of a desired geometry and f(x) is its distance function, that is, its distance to the measurement point assigned thereto.

In the case of the conventional standard adaptation, the pregiven geometry can additionally contain parameters or a parameter vector $\mu \in R^n$ in addition to the actual desired geometry. This parameter vector defines a scaling of the desired geometry. Accordingly, the following applies:

$$x = x(\mu).$$ Equation 1:

In addition, the pregiven geometry is subjected to a linear coordinate transformation. This linear coordinate transformation comprises a translation via a translation vector $c \in R^3$ and a rotation via a rotation matrix $Q(\epsilon) \in R^{3 \times 3}$. The parameter vector $\epsilon \in R^3$ contains the three rotational angles (α, β, γ) about the x-axis, y-axis and z-axis from which the matrix $(Q(\epsilon))$ is formed. If one combines the described parameters to a vector $g = (\mu, \epsilon, c)^T$ (T stands for transposed), there results the minimization problem to be solved for the minimization in accordance with the Gaussian method of least squares when $f(Q(\epsilon)x(\mu)+c)$ is the distance of a measurement point from a desired point (x) which is transformed via the function $u(\epsilon, \mu, c) = Q(\epsilon)x(\mu)+c$:

$$\text{Equation 2:} \quad F_G(g) = \sum_{Measuringpoints} f^2(Q(\varepsilon)x(\mu) + c) = \text{Min}!$$

If one would utilize Tschebyscheff, then the minimization problem to be solved is:

$$\text{Equation 3:} \quad F_T(g) = \underset{Measuringpoints}{\text{Max}} |f(Q(\varepsilon)x(\mu) + c)| = \text{Min}!$$

Equation 2 or equation 3 can be solved in a manner known per se. The minimum can be determined in accordance with known numerical methods such as the Newton-Raphson method. The Simplex or the Householder method can then be used for the linear minimization problems which occur here. The parameters of the translation vector (c), the rotation matrix $(Q(\epsilon))$ and the parameter vector (μ) are determined iteratively.

Compared to this conventional approach, which has been used in measuring technology for a long time, additionally transformation parameters (q) are provided which describe a transformation rule (T(q)) for a similarity transformation of the pregiven geometry (x(μ)). The transformation parameters (q) are parameterized as vector $q \in R^m$.

The approach of the invention in accordance with Gauss is as follows:

$$\text{Equation 4:} \quad F_G^*(q, g) = \sum_{Measuringpoints} f^2(Q(\varepsilon)T(q, x(\mu)) + c) = \text{Min}!$$

The corresponding approach in accordance with Tschebyscheff is:

$$\text{Equation 5: } F_T^*(q,g) = \underset{Measuringpoints}{\text{Max}} |f(Q(\varepsilon)T(q,x(\mu))+c)| = \text{Min}!$$

The equation can be solved in a manner analog to the procedure set forth above in connection with equations 2 and 3.

Figure 2:
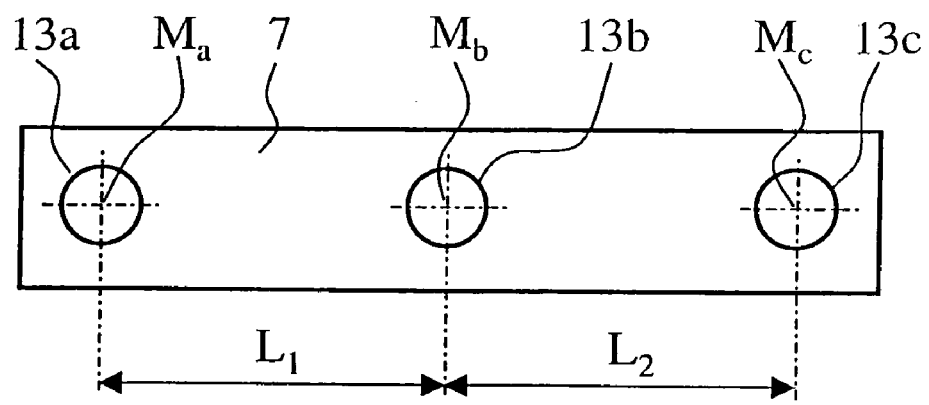
FIG. 2 shows the desired geometry of a workpiece 7 to be measured.
Figure 3:
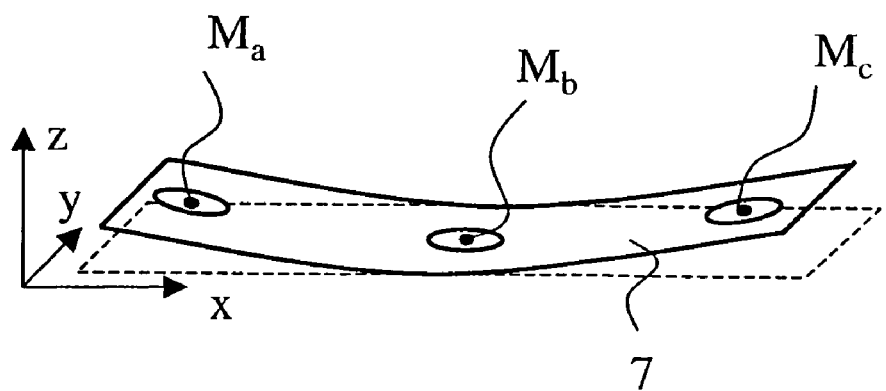
FIG. 3 shows an actual geometry of the workpiece 7 of FIG. 2.
Figure 4:
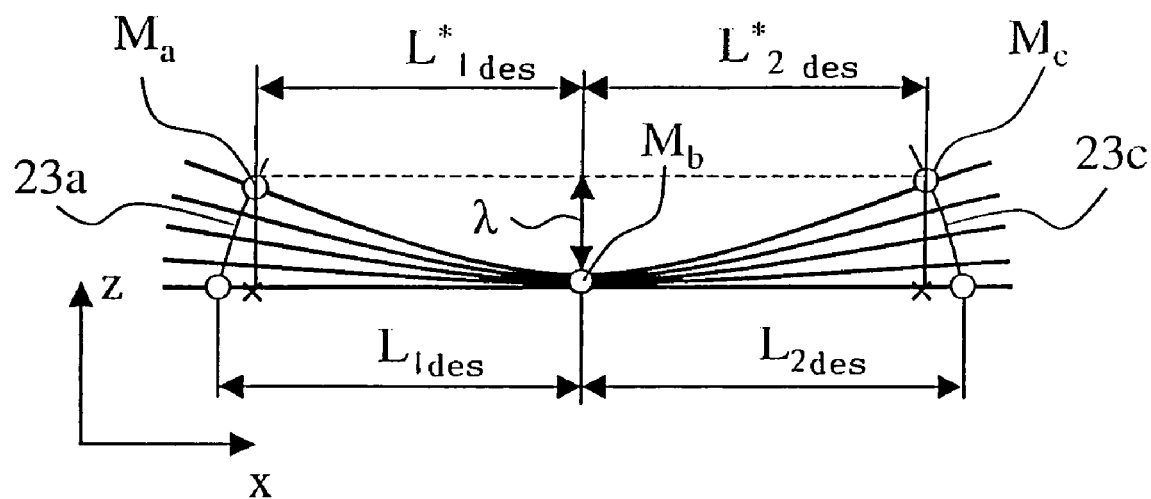
FIG. 4 is a schematic illustration for modeling the transformation parameters (a, λ) for the workpiece of FIGS. 2 and 3.

With reference to FIGS. 2 to 4, a first specific embodiment of the method of the invention will now be shown.

In FIG. 2, the desired geometry of a workpiece 7 is shown. The workpiece is a flat piece of sheet metal in which three holes (13a, 13b, 13c) are stamped. What is of concern is especially the distance of the center points $\overline{M_aM_b}$ and $\overline{M_bM_c}$ which are shown by reference characters ($L_{1des}$ and $L_{2des}$). In the actual manufacturing operation, the sheet metal bends as shown in FIG. 3. The sheet metal piece is usually machined with a punching tool and bends because of the inherent stresses developed thereby. The broken line is the form which would result if the workpiece 7 would be placed on a planar support surface and a force would be applied at both ends so that the workpiece deforms into a planar position. The solid line shows the actual contour of the workpiece 7.

In the sense of a model formation of this physical situation, the deformation of the sheet metal strip can be seen as constant in the y-direction (in FIG. 4, perpendicular to the plane of the paper) and one obtains the task shown in FIG. 4. Herein it is modeled how the desired geometry of the workpiece would have to theoretically deform during a processing of the workpiece so that the desired geometry is deformed into a position which corresponds to an actually measured workpiece. Here, the center points ($M_a$ and $M_c$) move on paths 23a and 23c. The actually measured distances of the workpiece 7 between the center points ($M_a$ and $M_b$) or between ($M_b$ and $M_c$) of the holes (13a, 13b, 13c) are identified by ($L^*_{1act}$ and $L^*_{2act}$) and correspond to the distances ($L^*_{1des}$ and $L^*_{2des}$) of the deformed desired geometry (see FIG. 4). The distances ($L^*_{1act}$ and $L^*_{2act}$) are not shown in FIG. 4 for the sake of clarity. Compared to the true distances ($L^*_{1act}$ and $L^*_{2act}$), these measured distances ($L_{1act}$ and $L_{2act}$) of the workpiece 7 are shortened in the same manner as the desired geometry shown in FIG. 4 because of the deformation of the workpiece 7.

For simplification, it is assumed in the model formation that the distances ($L_{1des}$ and $L_{2des}$) of the center points ($\overline{M_aM_b}$ and $\overline{M_bM_c}$) are the same so that ($L_{1des}=L_{2des}$) and the center point ($M_b$) lie precisely on the x-axis. The objective of providing a similarity transformation in the example shown has to be that the deformation is modeled in the context of a "best fit" adaptation. For this purpose, it is necessary that the bending behavior of the workpiece 7 be analytically captured. This is achieved by means of the approach:

$$\text{Equation 6: } T(\lambda, a; t) = \begin{pmatrix} x(t) \\ z(t;\lambda,a) \end{pmatrix} = \begin{pmatrix} t \\ \lambda\cos(\frac{\pi}{2a}t) \end{pmatrix}.$$

The form of the workpiece 7 $T(\lambda, a; t)$ is dependent upon the following variables:
the variable (t) is the parameter of the curve $T(\lambda, a; t)$ via which the curve $T(\lambda, a; t)$ is parameterized.
the parameter ($\lambda$) identifies the bending which results for a uniform bending of the planar desired geometry of the strip to the actually bent workpiece 7. This bending is measured in the strip center and this bending results from the distance of the connecting line between the center points ($M_a$ and $M_c$) and the center point ($M_b$) and can be determined as the distance to the x-axis.

the parameter (a) represents the distance between the center points ($M_a$ and $M_b$) or the distance between the center points ($M_b$ and $M_c$) of the bent desired geometry of the sheet metal strip which varies naturally in dependence upon the bending ($\lambda$) (see FIG. 4). The distance between the center points ($M_b$ and $M_c$) is assumed to be equal to the distance between the center points ($M_a$ and $M_b$). The bent desired geometry of the sheet metal strip is projected on the x-axis.

For correcting the arising measurement error from the shortening of the measured distances ($L^*_{1act}$ and $L^*_{2act}$) compared to the true lengths ($L_{1act}$ and $L_{2act}$), the steps can be undertaken which are shown above, that is, the transformation of the actual geometry to the desired geometry and vice versa. In the following, the case for transforming the desired geometry to the adaptation to the actual geometry is shown.

In the context of the best fit adaptation, the vector (q) has the parameters (a and $\lambda$), which permit a defined transformation of the desired geometry (that is, a defined transformation of the planar sheet metal strip) with reference to a targeted geometric change of form of the desired geometry. The defined transformation of the desired geometry goes beyond the pure scaling of the desired geometry.

The parameters of the vector (q) (that is, the bending ($\lambda$) and the integration limits (a)) are optimized for adaptation of the pregiven form to the measurement data (bent strip).

Furthermore, a rotation takes place in accordance with the angles of the parameter vector ($\epsilon$) and a translation in accordance with the vector (c) of the pregiven geometry in the sense of the standard adaptation. Here, a two-dimensional problem is present and a rotation can take place only about the y-axis. For this reason, the above-identified parameter ($\epsilon$) for the rotation matrix ($Q(\epsilon)$) is only one-dimensional. Here, the rotation angle ($\beta$) is concerned so that the corresponding rotation matrix ($Q(\beta)$) is as follows:

$$\text{Equation 7: } Q(\beta) = \begin{pmatrix} \cos(\beta) & \sin(\beta) \\ -\sin(\beta) & \cos(\beta) \end{pmatrix}.$$

In the two-dimensional case, the translation vector (c) permits only a translation in the axial directions (x and z) so that the translation vector (c) is as follows:

$$\text{Equation 8: } c = \begin{pmatrix} c_x \\ c_z \end{pmatrix}.$$

In this way, one obtains the following form of the sheet metal strip model:

$$u_{BestFit}(t;\lambda,a,Q,c) = Q(\alpha)T(\lambda,a;t)+c \quad \text{Equation 9:}$$

Stated more completely:

Equation 10:

$$u_{BestFit}(t;\lambda,a,\beta,c_x,c_z) = \begin{pmatrix} \cos(\beta) & \sin(\beta) \\ -\sin(\beta) & \cos(\beta) \end{pmatrix}\begin{pmatrix} t \\ \lambda\cos(\frac{\pi}{2a}t) \end{pmatrix} + \begin{pmatrix} c_x \\ c_z \end{pmatrix}.$$

The model obtained has five degrees of freedom which describe the similarity transformation to be used for the best fit adaptation.

The fitting or adaptation can take place in such a manner that the holes ($13a$, $13b$, $13c$) are measured on the bent workpiece 7 and the center points ($M_a$, $M_b$ and $M_c$) are determined. For each of the three center points ($M_a$, $M_b$ and $M_c$), the distance function $f(u_{BestFit})$ between the function $U_{BestFit}(t; \lambda, a, \beta, c_x, c_z)$, which is defined in accordance with equation 10, and the particular center point ($M_a$, $M_b$ and $M_c$) can be formulated. In accordance with the approach of Gauss described already above in connection with equation 3 (to minimize the sum of the squares of the so determined distance function), the parameters ($\lambda$, a, $\beta$, $c_x$, $c_z$) can be determined in accordance with the procedure described likewise in connection with equation 3. Furthermore, the curve parameters ($t_a$, $t_b$, $t_c$) are known which give the position of the center points ($M_a$, $M_b$ and $M_c$) in the function defined in accordance with equation 6. The true distances ($L_{1act}$ and $L_{2act}$) between the center points ($M_a$ and $M_b$) or the center points ($M_b$ and $M_c$) can then be computed via the following formulas:

Equation 11:

$$L_{1act}(\lambda, a) = \int_{t_a}^{t_b} \sqrt{(x'(t))^2 + (z'(t))^2}\, dt$$

$$= \int_{t_a}^{t_b} \sqrt{1 + \frac{\pi^2 \lambda^2}{4a^2} \sin^2\left(\frac{\pi}{2a} t\right)}\, dt$$

and

Equation 12:

$$L_{2act}(\lambda, a) = \int_{t_b}^{t_c} \sqrt{(x'(t))^2 + (z'(t))^2}\, dt$$

$$= \int_{t_b}^{t_c} \sqrt{1 + \frac{\pi^2 \lambda^2}{4a^2} \sin^2\left(\frac{\pi}{2a} t\right)}\, dt$$

and are checked relative to the pregiven lengths ($L_{1des}$ and $L_{2des}$) of the desired geometry as to inaccuracy.

Figure 5:
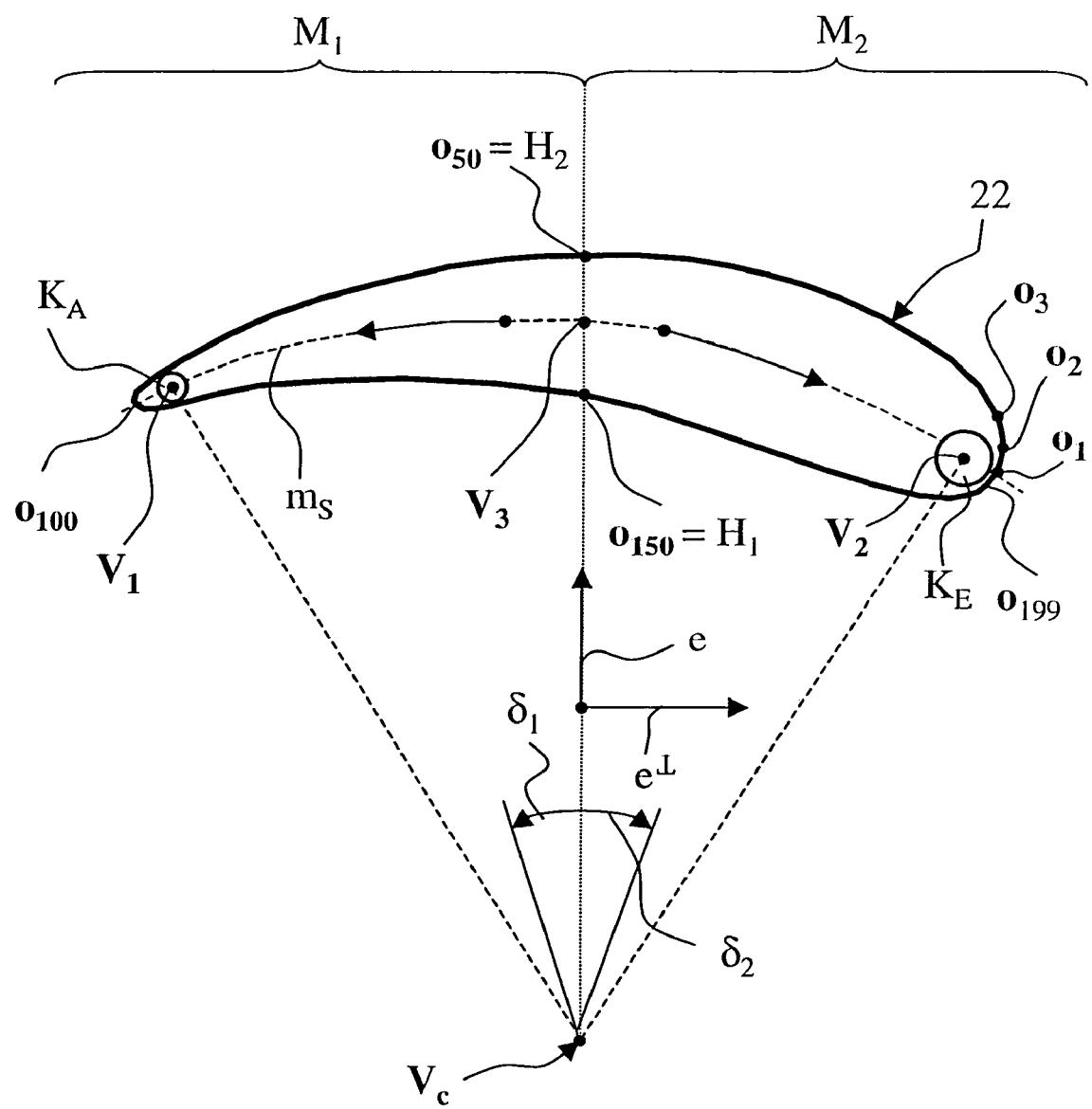
FIG. 5 is a second embodiment of an adaptation of the invention having a desired geometry 22 in the form of a profile of a turbine blade.

A further especially advantageous embodiment of the invention will now be described with respect to FIG. 5.

Here, the task is the measurement of turbine blades and especially the measurement of the profile of turbine blades. The fitting or adaptation of a pregiven desired geometry of a turbine blade profile into the measurement points of an actually measured turbine blade profile is often very problematic because the actually measured turbine blade profile is often shorter or longer than the pregiven desired geometry. The tolerances of the form deviations usually are very small but, on the other hand, the permissible length deviations are very large. For this reason, a contradiction arises between the form deviations and the length deviations especially in the area of the acute angular exit edge of the turbine blade profile so that a purposeful fitting of the desired geometry is therefore not possible.

To resolve this contradiction, it is necessary to change the desired geometry 22 of a turbine blade profile (see FIG. 5), which is here defined by a plurality of individual points ($o_j$), $j=1 \ldots 199$, via a similarity transformation so that the length deviation is compensated for. For the sake of clarity, only a few of the points are identified. For this purpose, a stretching of the desired geometry 22 of the turbine blade profile is an option. Turbine blade profiles are always constructed about a pregiven profile center line. For this reason, a stretching of the desired geometry 22 of the turbine blade profile either along this line or along a correspondingly approximated line ($m_s$) is to be undertaken in order to ensure the aerodynamic characteristics of the turbine blade.

For a plurality of turbine blade profiles, a circle line functions as the starting point of the construction of these profiles so that the approximation of the profile center line by means of a circle is appropriate. The method described below is used for the construction of a corresponding approximating circle line ($m_s$) to a given desired geometry 22 of a profile.

As a first step, the classical fitting of two circles ($K_E$ and $K_A$) takes place by means of the Tschebyscheff method or the Gauss best-fit method into the entry edge or the exit edge. The entry edge is disposed at the point ($o_1$) of the desired geometry 22 and the exit edge is disposed at the point ($o_{100}$) of the desired geometry 22 of the blade profile. For this purpose, corresponding points ($o_j$) in the pregiven desired geometry 22 are selected in the region of the entry edge and the exit edge into which the circles ($K_E$ and $K_A$) are fitted. In the result of this fitting, the center points of circles ($K_E$ and $K_A$) are available as points ($V_1$ and $V_2$) which define already two points of the circularly-shaped line ($m_s$) to be constructed. A third point is still necessary in order to establish the circularly-shaped line ($m_s$). Different methods are available for the determination of this point ($V_3$). For example, for an almost uniform distribution of the points ($o_j$) defining the desired geometry 22 on the turbine blade profile, the computation of two auxiliary points ($H_1$ and $H_2$) can be obtained on the lower side or upper side of the profile in that that point ($o_j$) on the upper side of the profile and that point ($o_j$) on the lower side of the profile can be used, the index (j) of which is half of the difference between the point ($o_1$) of the entry edge and the point ($o_{100}$) of the exit edge. These points are the points ($o_{50}$) and ($o_{150}$) in this example which is deliberately selected for the sake of simplicity. The third point ($V_3$), which is still missing, can be obtained at half the distance of the two obtained auxiliary points ($H_1$ and $H_2$)

In a second step, a circle is fitted into the points ($V_1$, $V_2$ and $V_3$) the center point of which is ($V_c$). Furthermore, the direction vector (e) and a vector ($e^\perp$) perpendicular thereto are determined by the connecting line of the point ($V_3$) with the center point ($V_c$). With the aid of this vector (e), the points ($o_1$, $o_2$, $\ldots o_{SM}$) of the desired geometry 22 of the turbine blade profile can be subdivided into two quantities ($M_1$ and $M_2$). A point ($o_j$) of the desired geometry 22 of the turbine blade profile belongs to ($M_1$) in the event that the scalar product $(o_j - V_c)^T e^\perp$ is positive, otherwise, this point belongs to the quantity ($M_2$). The rotation of the points of the quantities $M_k$, $k=1, 2$, having rotation center ($v_c$) takes place corresponding to the above condition in each case about the angle ($\delta_i$), $i=1, 2$. The quantity ($M_1$) is rotated about the angle ($\delta_1$) and the quantity ($M_2$) is rotated about the angle ($\delta_2$).

In the context of the best fit adaptation, the similarity parameters ($\delta_i$) are optimized for the adaptation of the desired geometry 22 to the measurement data. For this purpose, the similarity transformation ($T(\delta_i)$) is applied to the points ($o_j$) of the quantities $M_k$, $k=1, 2$:

$$T(\delta_i, o_j) = B(\delta_i)(o_j - V_c) + V_c = B(\delta_i) o_j + (I - B(\delta_i)) V_c \quad \text{Equation 13:}$$

wherein (I) is the unit matrix and $(B(\delta_i))$ is a rotation matrix having the following configuration:

$$\text{Equation 14: } B(\delta_i) = \begin{pmatrix} \cos(\delta_i) & \sin(\delta_i) \\ -\sin(\delta_i) & \cos(\delta_i) \end{pmatrix}.$$

Furthermore, a rotation and a translation of the points takes place in the sense of a standard fitting while using the rotation matrix:

$$\text{Equation 15: } Q(\gamma) = \begin{pmatrix} \cos(\gamma) & \sin(\gamma) \\ -\sin(\gamma) & \cos(\gamma) \end{pmatrix}$$

and the translation vector $c=\varphi e$. For reasons of the numerical stability of the method, only a displacement of the nominal data is permissible in the direction of vector (e). The total transformation for the quantities $M_k$, k=1, 2 contains the parameters ($\gamma$ and $\varphi$) of the standard transformation as well as the similarity parameters ($\delta_1$ or $\delta_2$). The formation rule for the similarity transformed points is given by:

$$p_j(\delta_i, Q, c) = Q(\gamma)(B(\delta_i)(o_j - V_c) + V_c) + c \quad \text{Equation 16:}$$

or more completely:

$$\text{Equation 17: } p_j(\delta_i, \gamma, \varphi) \begin{pmatrix} \cos(\gamma) & \sin(\gamma) \\ -\sin(\gamma) & \cos(\gamma) \end{pmatrix}$$

$$\left( \begin{pmatrix} \cos(\delta_i) & \sin(\delta_i) \\ -\sin(\delta_i) & \cos(\delta_i) \end{pmatrix} (o_j - v_c) + v_c + \varphi \begin{pmatrix} e_x \\ e_y \end{pmatrix} \right).$$

Which of the similarity parameters $\delta_i$, i=1, 2, are to be applied for a point $(o_j)$ is dependent, as described above, on the affiliation of $(o_j)$ to the quantities ($M_1$ or $M_2$).

The model obtained has four degrees of freedom which describe the similarity transformation to be used for the best fit adaptation.

The adaptation or fitting can now take place in such a manner that the profile to be investigated is measured on a specific turbine blade. For each measured measurement point, the distance function $(f(p_j))$ is established to a corresponding point $(p_j)$ which results from the transformation of a point $(o_j)$ of the desired geometry 22 with the function $p_j(\delta_i, \gamma, \varphi)$ in accordance with equation 17. The parameters $(\delta_i, \gamma, \varphi)$ are determined via the approach according to Gauss described above in connection with equation 3 (that is, to minimize the sum of the squares of all distance functions so determined), so that each of the points $(o_j)$ of the desired geometry 22 can be converted into a transformed point $(p_j)$ in accordance with the relationship of equation 17. This transformation of the points $(o_j)$ according to the similarity parameters ($\delta_1$ or $\delta_2$) corresponds, however, to a shift of the points $(o_j)$ of the desired geometry 22 of the fluid-dynamic profile along the circle line $(m_s)$ in such a manner that the distance of the point $(o_j)$ to the circle line $(m_s)$ remains constant.

The distance of the actually measured measurement points of the profile compared to the transformed points $(p_j)$ of the profile can now be determined. It is now checked whether the measurement points (especially in the region of the exit edge) are disposed within the very tightly measured tolerances.

Figure 6:
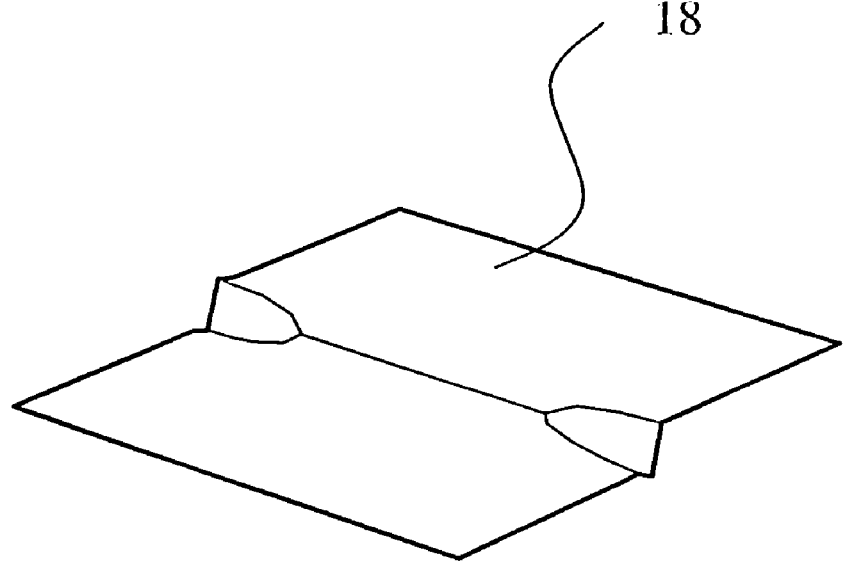
FIG. 6 shows a third embodiment showing the desired geometry 18 of a deep-drawn workpiece.
Figure 7:
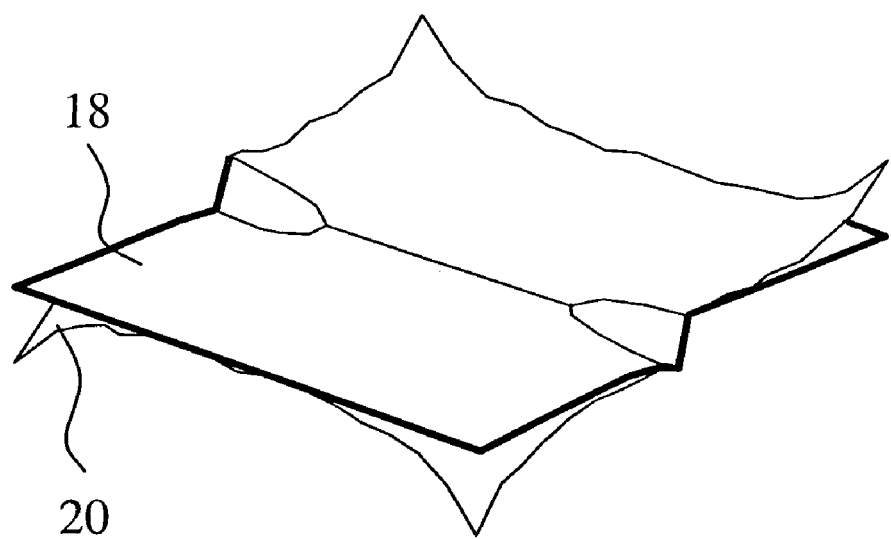
FIG. 7 is an illustration of the measurement points 20 of a real workpiece and the desired geometry 18 according to FIG. 8; and, FIG. 8 shows the measurement points 20 of a real measured workpiece and the adapted desired geometry 21 which was adapted to the measurement points 20 of the real workpiece via a similarity transformation.
Figure 8:
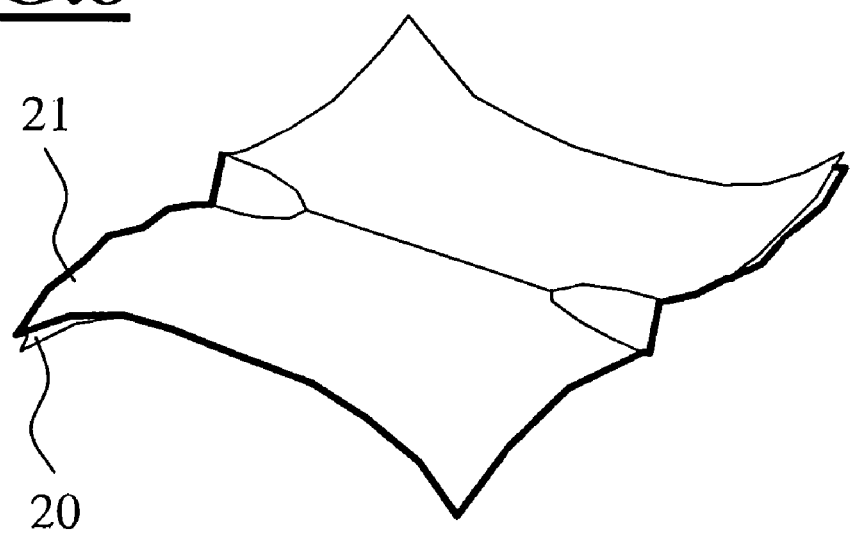

A further example will now be explained with respect to FIGS. 6 to 8. In FIG. 6, the desired geometry 18 of a chassis part is shown which is intended to be obtained from the piece of sheet metal via a deep-draw process. The desired geometry is pregiven by a CAD model.

The primary problem in this procedure is a spring back of the deformed part because of the inherent stresses of the chassis part. This effect disturbs the measured data in an order of magnitude which lies above the amount, which is to be checked, of the edge introduced into the part. If the tolerance limits for the edge are very small in the chassis part, then a standard adaptation is not successful because the deformation errors of the part superpose the errors of the edge or cover the same. This state is shown in FIG. 7. Reference numeral 18 identifies the desired geometry of the workpiece to be measured while reference numeral 20 identifies the actual measurement points of the deep-drawn workpiece. In order to be able to make a check of the measured contour at all possible, it is therefore necessary to adapt the desired geometry via a similarity transformation to the deformation contained in the measuring data as shown in FIG. 8. Reference numeral 21 identifies a fitted desired geometry 18 which was adapted to the measured workpiece via the similarity transformation.

It is understood that the foregoing description is that of the preferred embodiments of the invention and that various changes and modifications may be made thereto without departing from the spirit and scope of the invention as defined in the appended claims.

What is claimed is:

1. A method for measuring a workpiece, the method comprising the steps of:

measuring measurement points on the surface of said workpiece utilizing a measuring apparatus to obtain measured measurement points;

evaluating said measured measurement points so as to map a pregiven desired geometry and an actual geometry defined by said measured measurement points one upon the other with a fitting method;

providing transformation parameters (a, λ, $\delta_i$) for said fitting method;

utilizing said transformation parameters (a, λ, $\delta_i$) to provide a defined transformation of one of said desired geometry and said actual geometry with respect to a targeted geometric change of form of one of said desired geometry and said actual geometry with said defined transformation being achieved without scalar dimensional changes and not being limited to a scaling of one of said desired geometry and said actual geometry;

determining deviations between the actually measured measurement points and said pregiven desired geometry; and, providing an output representing the determined deviations.

2. The method of claim 1, wherein said transformation parameters (a, λ, $\delta_i$) define a deformation of one of said desired geometry and said actual geometry.

3. The method of claim 2, wherein the transformation parameters (a, λ) define a deformation of said workpiece which results because of manufacturing processes of said workpiece.

4. A method for measuring a workpiece, the method comprising the steps of:

measuring measurement points on the surface of said workpiece utilizing a measuring apparatus to obtain measured measurement points;

evaluating said measured measurement points so as to map a pregiven desired geometry and an actual geometry defined by said measured measurement points one upon the other with a fitting method;

providing transformation parameters (a, λ, $δ_i$) for said fitting method;

utilizing said transformation parameters (a, λ, $δ_i$) to provide a defined transformation of one of said desired geometry and said actual geometry with respect to a targeted geometric change of form of one of said desired geometry and said actual geometry with said defined transformation not being limited to a scaling of one of said desired geometry and said actual geometry;

wherein said transformation parameters (a, λ, $δ_i$) define a deformation of one of said desired geometry and said actual geometry;

wherein the transformation parameters (a, λ) define a deformation of said workpiece which results because of manufacturing processes of said workpiece;

wherein the transformation parameters (a, λ) define a deformation of said workpiece which occurs because of thermal or chemical processes during manufacture of said workpiece;

determining deviations between the actually measured measurement points and said pregiven desired geometry; and, providing an output representing the determined deviations.

5. A method for measuring a workpiece, the method comprising the steps of:

measuring measurement points on the surface of said workpiece utilizing a measuring apparatus to obtain measured measurement points;

evaluating said measured measurement points so as to map a pregiven desired geometry and an actual geometry defined by said measured measurement points one upon the other with a fitting method;

providing transformation parameters (a, λ, $δ_i$) for said fitting method;

utilizing said transformation parameters (a, λ, $δ_i$) to provide a defined transformation of one of said desired geometry and said actual geometry with respect to a targeted geometric change of form of one of said desired geometry and said actual geometry with said defined transformation not being limited to a scaling of one of said desired geometry and said actual geometry;

wherein said desired geometry is a fluid-dynamic profile and the transformation parameters ($δ_i$) define a shift of points ($o_j$) of said desired geometry along a curved shift line ($m_s$) so as to cause the distance of the points ($o_j$) to said curved shift line ($m_s$) to remain constant;

determining deviations between the actually measured measurement points and said pregiven desired geometry; and, providing an output representing the determined deviations.

6. The method of claim 5, wherein said curved shift line ($m_s$) is a line which approximates essentially the center line of said desired geometry of said profile.

7. The method of claim 6, wherein said shift line ($m_s$) is a circle.

8. The method of claim 5, wherein the points ($o_j$) of said desired geometry of said fluid-dynamic profile are partitioned into two parts ($M_1$, $M_2$) and the transformation parameters ($δ_i$) permit a shift of said points ($o_j$) of said two parts ($M_1$, $M_2$) in different directions ($δ_1$, $δ_2$).

9. The method of claim 1, wherein said measuring apparatus is a coordinate measuring apparatus.

10. The method of claim 5, wherein said fluid-dynamic profile is a turbine blade profile.

11. A measuring apparatus for measuring a workpiece, the measuring apparatus comprising:

a measuring sensor system for measuring measurement points on the surface of said workpiece to obtain measured measurement points;

an evaluation unit for evaluating said measured measurement points so as to map a pregiven desired geometry and an actual geometry defined by said measured measurement points one upon the other with a fitting method; and, said evaluation unit being configured to utilize transformation parameters (a, λ, $δ_i$) for said fitting method wherein said transformation parameters (a, λ, $δ_i$) permit a defined transformation of one of said desired geometry and said actual geometry with respect to a targeted geometric change of form of one of said desired geometry and said actual geometry with said defined transformation not being limited to a scaling of one of said desired geometry and said actual geometry.

12. The apparatus of claim 11, wherein said evaluation unit utilizes said transformation parameters (a, λ, $δ_i$) which define a deformation of one of said desired geometry and said actual geometry.

13. The apparatus of claim 12, wherein said evaluation unit utilizes the transformation parameters which define a deformation of said workpiece which results because of manufacturing processes of said workpiece.

14. The apparatus of claim 13, wherein said evaluation unit uses the transformation parameters which define a deformation of said workpiece which occurs because of thermal or chemical processes during manufacture of said workpiece.

15. The apparatus of claim 11, wherein said desired geometry is a fluid-dynamic profile and the transformation parameters ($δ_i$) define a shift of points ($o_j$) of said desired geometry along a curved shift line ($m_s$) so as to cause the distance of the points ($o_j$) to said curved shift line ($m_s$) to remain constant.

16. The apparatus of claim 15, wherein said curved shift line ($m_s$) is a line which approximates essentially the center line of said desired geometry of said profile.

17. The apparatus of claim 16, wherein said shift line ($m_s$) is a circle.

18. The apparatus of claim 15, wherein the points ($o_j$) of said desired geometry of said fluid-dynamic profile are partitioned into two parts ($M_1$, $M_2$) and the transformation parameters ($δ_i$) permit a shift of said points ($o_j$) of said two parts ($M_1$, $M_2$) in different directions ($δ_1$, $δ_2$).

19. The apparatus of claim 11, wherein said measuring apparatus is a coordinate measuring apparatus.

20. The apparatus of claim 15, wherein said fluid-dynamic profile is a turbine blade profile.

* * * * *

UNITED STATES PATENT AND TRADEMARK OFFICE
CERTIFICATE OF CORRECTION

| | | |
|---|---|---|
| PATENT NO. | : 7,194,378 B2 | Page 1 of 1 |
| APPLICATION NO. | : 11/065153 | |
| DATED | : March 20, 2007 | |
| INVENTOR(S) | : Daniel Goersch and Andreas Lotze | |

It is certified that error appears in the above-identified patent and that said Letters Patent is hereby corrected as shown below:

Column 2:
Line 36 : delete "deepdraw" and insert -- deep-draw -- therefor.

Column 8:
Line 57 : delete "$u_{BestFit} (t ; \lambda, a, Q, c) = Q(\alpha) T(\lambda, a ; t) + c$" and insert -- $u_{BestFit} (t ; \lambda, a, Q, c) = Q(\beta) T(\lambda, a ; t) + c$ -- therefor.

Column 10:
Line 49 : delete " $(o_1, o_2, \ldots o_{SM})$ " and insert -- $o_1, o_2, \ldots o_{199}$) -- therefor
Line 56 : delete " $(v_c)$ " and insert -- $(V_c)$ -- therefor.

Column 11:
Line 34 : delete "$\left[ \begin{pmatrix} \cos(\delta_i) & \sin(\delta_i) \\ -\sin(\delta_i) & \cos(\delta_i) \end{pmatrix} (o_j - v_c) + v_c + \varphi \begin{pmatrix} e_x \\ e_y \end{pmatrix} \right]$"

and insert -- $\left[ \begin{pmatrix} \cos(\delta_i) & \sin(\delta_i) \\ -\sin(\delta_i) & \cos(\delta_i) \end{pmatrix} (o_j - V_c) + V_c \right] + \varphi \begin{pmatrix} e_x \\ e_y \end{pmatrix}$ -- therefor.

Signed and Sealed this

Third Day of July, 2007

JON W. DUDAS
*Director of the United States Patent and Trademark Office*